(12) United States Patent
Yoshikawa

(10) Patent No.: US 7,280,724 B2
(45) Date of Patent: Oct. 9, 2007

(54) OPTICAL SUBASSEMBLY AND OPTICAL TRANSCEIVER INSTALLING THE SAME

(75) Inventor: Satoshi Yoshikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/152,248

(22) Filed: Jun. 15, 2005

(65) Prior Publication Data
US 2005/0286839 A1    Dec. 29, 2005

Related U.S. Application Data

(60) Provisional application No. 60/579,679, filed on Jun. 16, 2004.

(51) Int. Cl.
G02B 6/02 (2006.01)
G02B 6/255 (2006.01)

(52) U.S. Cl. .......................................... 385/52; 385/92
(58) Field of Classification Search ................. 385/52, 385/92
See application file for complete search history.

(56) References Cited

U.S. PATENT DOCUMENTS 5,325,455 A * 6/1994 Henson et al. ................. 385/89
6,873,800 B1 * 3/2005 Wei et al. ..................... 398/138
2002/0150343 A1 * 10/2002 Chiu et al. ..................... 385/53
2004/0101253 A1 * 5/2004 Jong et al. ..................... 385/78
2005/0213892 A1 * 9/2005 Barnes et al. .................. 385/62
2005/0281514 A1 * 12/2005 Oki et al. ....................... 385/92

FOREIGN PATENT DOCUMENTS

JP    2001-066468    3/2001

* cited by examiner

Primary Examiner—K. Cyrus Kianni
(74) Attorney, Agent, or Firm—Venable LLP; Michael A. Sartori; Steven J. Schwarz

(57) ABSTRACT

The present invention relates to an optical transceiver that suppresses the EMI radiation through the optical receptacle and the discharge of the static electricity attributed to the optical connector through the optical receptacle. The optical transceiver of the invention includes an optical subassembly comprising a resin made sleeve cover in addition to a metal package and the metal sleeve assembly. Since the resin sleeve cover secures the tip of the sleeve assembly, the EMI discharge and the noise radiation through this sleeve cover can be suppressed. Moreover, the sleeve cover and the bush both included in the sleeve assembly form a united flange. Accordingly, the frame and the holder for positioning the optical subassembly are unnecessary to provide a specific structure.

15 Claims, 13 Drawing Sheets

OPTICAL SUBASSEMBLY AND OPTICAL TRANSCEIVER INSTALLING THE SAME

CROSS REFERENCE TO RELATED APPLICATION

This application claims the benefit of the provisional application 60/579,679, provisionally filed on Jun. 16, 2004.

BACKGROUND OF THE INVENTION

1. Field of the Invention

The present invention relates to an optical subassembly and an optical transceiver, in particular, relates to a structure of the subassembly with an insulating sleeve cover for securing the sleeve.

2. Related Prior Art

The optical transceiver typically comprises a housing, into which a substrate for installing an electronic circuit and an optical subassembly for converting an optical signal into an electronic signal are installed. The housing also forms an optical receptacle for receiving an optical connector securing the optical fiber through which the optical signal is transmitted. The conventional optical subassembly is generally comprised of metal members from the viewpoints of mechanical toughness and the productivity, because the welding, especially the YAG laser welding, facilitates the assembling of the metal members.

However, such optical assembly comprised of wholly metal component exposes the metal parts at the optical receptacle, accordingly, the EMI (Electro-Magnetic Interference) noise comes in or radiates from the transceiver as the metal parts exposed to the outside operates as an antenna. Moreover, the optical connector typically made of resin is easy to be statically charged. When the charged optical connector inserts into the receptacle, the static charge accompanied with the connector may discharge through the metal sleeve exposed in the receptacle, which causes the spontaneous large current to break the electronic and optical devices installed in the transceiver.

An optical assembly with a sleeve cover made of resin has been developed instead of wholly metallic optical assembly. Japanese patent application published as 2001-066468 has disclosed such partially resin-made assembly. The optical assembly having such partially resin-made sleeve shows a superior performance for the EMI noise coming in the transceiver and for the switching noise of the large current for driving the laser diode (LD) from leaking from the transceiver. Moreover, the resin-made products inherently has a large insulation resistance, accordingly, the damages by the electrostatic discharge can be prevented.

On the other hand, such optical assembly partially comprising resin-made components has a subject that, because the welding can not apply to fix the components, the fixing strength does not increase and is not maintained, although the welding is a popular technique for fixing the whole metal assembly. To devise the structure of respective components of the assembly may increase and maintain the fixing strength between components. However, to devise the structure, or to make the structure of the assembly complex, results in the increase of the cost in both the components itself and the production thereof.

SUMMARY OF THE INVENTION

Therefore, one objects of the present invention is, for an optical assembly having partially nonmetallic components, to provide a structure of the assembly not to weaken the fixing strength between components and not to incur the cost increase of the components, and to provide an optical transceiver using these optical subassembly.

An optical subassembly according to the present invention comprises a package and a sleeve assembly attached to the package. The package installs a semiconductor optical device, such as semiconductor laser diode for a transmitting optical subassembly or semiconductor photodiode for a receiving optical subassembly. The sleeve assembly includes a sleeve, a bush, and a sleeve cover. The sleeve cover is made of resin and covers the bush and the sleeve, while the bush is made of metal. The bush provides a first flange in the circumference thereof, and the sleeve cover provides a second flange that constitutes a united flange when the bush is assembled with the sleeve cover.

The bush may include first and second portions each having a bore. A diameter of the bore of the first portion is equal to or slightly smaller than an outer diameter of the sleeve such that the sleeve is press-fitted in the bore of the first portion. On the other hand, the outer diameter of the sleeve is smaller than a diameter of the bore of the second portion such that a gap exists between the sleeve and the bore of the second portion of the bush. Accordingly, Only the first portion of the bush secures the sleeve.

The sleeve cover may also include first and second portion each having a bore. A diameter of the bore in the first portion of the sleeve cover is equal to or slightly smaller than an outer diameter of the second portion of the bush such that the bush in the second portion thereof is press-fitted in the bore of the first portion of the sleeve cover.

In the optical subassembly of the present invention, the first flange of the bush is formed in the first portion thereof close to the boundary between the first and the second portions of the bush. While, the first portion of the sleeve cover constitutes the second flange, so that the first portion of the sleeve cover may be in contact with the first flange provided in the bush to form the united flange when the bush is press-fitted in the sleeve cover.

The optical subassembly may further comprise a metal alignment member between the package and the sleeve assembly. The alignment member covers the side of the package to optically align in three-axes between the semiconductor optical device and an optical fiber inserted in the sleeve assembly.

The alignment member of the present invention may be divided into first and second members, both made of metal. The first member may cover the side of the package and the second member may cover and be welded to the first member. The sleeve assembly may be attached to the top of the second member.

Another aspect of the present invention relates to an optical transceiver using above described optical subassembly. The optical transceiver comprises of the optical subassembly above described, a holder, an upper cover made of metal, and a frame. The holder, holding the subassembly cooperated with the frame, includes a center portion and side portions arranged both sides of the center portion. The center portion has a pair of posts configured to form an opening in which the subassembly is held. The frame not only holds the subassembly cooperated with the holder but forms, cooperated with the upper cover, an optical receptacle to be mated with an optical connector including an optical fiber the optical transceiver communicates. Moreover, in the optical transceiver of the present invention, the posts provided in the center portion of the holder includes a pair of ribs and a groove sandwiched by the ribs, where the united flange of the subassembly is held by this groove.

In the optical transceiver of the present invention, the frame may further include a saddle for holding the subassembly. The saddle has a pair of ribs and a groove sandwiched by the ribs on the surface thereof. The subassembly may be held on the saddle such that the united flange of the subassembly is received in the groove when the holder is secured to the frame.

The holder may provide a post in the side portions thereof, and the frame may provide a groove in a side wall thereof. This groove in the side wall of the frame may be configured to receive the post when the holder is secured to the frame. Accordingly, the position of the holder in the frame may be automatically defined, which also defines an arrangement of the optical receptacle formed by the frame, the upper cover, and the holder.

When the optical transceiver of the present invention includes the transmitting optical subassembly and the receiving optical subassembly, the frame may provide a partition wall configured to divide these two subassemblies and the center portion of the holder may provide two pairs of posts, each holding these two subassemblies, to form an opening between these two pairs of posts. The holder may be held such that the opening between these two pairs of posts mates with the center partition wall.

Thus, the sleeve assembly according to the present invention provides, in the tip thereof, a resin-made sleeve cover and only this sleeve cover exposes within the optical receptacle. Accordingly, the EMI leaking through the sleeve cover can be effectively prevented. The optical subassembly provides a flange, the united flange, as a whole, even the sleeve cover and the bush are made of different material, i.e., the former is made of resin while the latter if made of metal. Accordingly, when the subassembly of the present invention is installed, no additional structure may be necessary to secure the subassembly.

Since the sleeve cover is made of insulating material, even when the optical connector to be mated with the optical receptacle is electrically charged, the insulating sleeve cover can prevent the connector from discharging the static charge to the inside of the transceiver, thereby enhancing the tolerance of the optical components such as laser diode and photodiode to the electrostatic discharge. Moreover, these advantages can be obtained without any specific structures for the subassemblies, but can be realized merely the united flange comprised of the flange in the sleeve cover and the other flange in the bush is positioned in the groove provided in the holder. Without any additional structures and steps from the viewpoint of the manufacturing, the optical transceiver of the present invention may be obtained.

DESCRIPTION OF PREFERRED EMBODIMENTS

Figure 1:
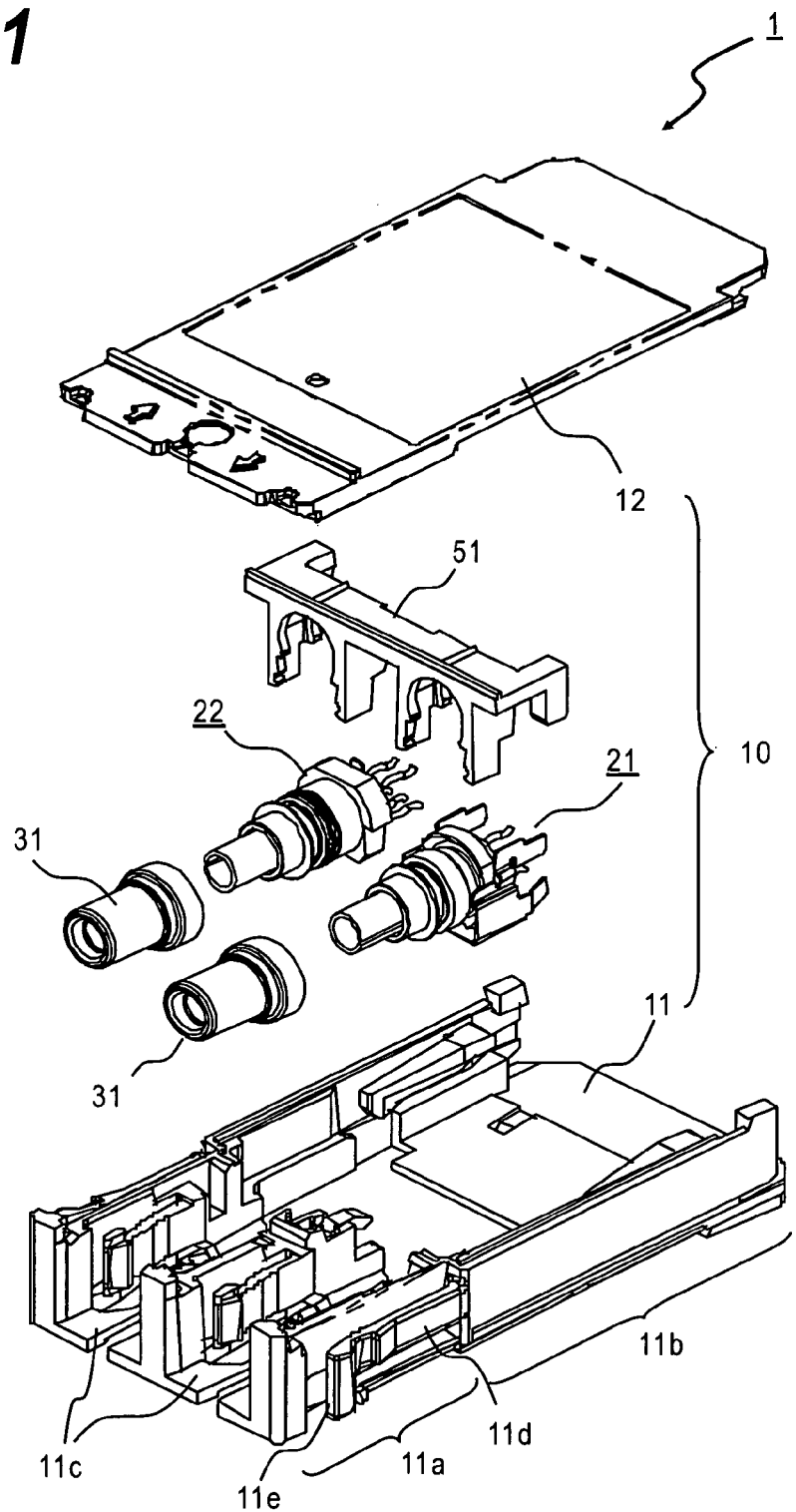
FIG. 1 is an exploded view of an optical transceiver according to the present invention.

Next, as referring to accompanying drawings, the optical subassembly and the configuration of the optical transceiver installing the optical subassembly will be described. In the drawings and the explanations below, the symbols and the numerals will refer the same elements without overlapping explanations.

FIG. 1 is an exploded view showing an optical transceiver using an optical assembly according to the present invention. In the optical transceiver 1, a frame 11 and an upper cover 12 forms a housing 10 within which a transmitting Optical Sub-Assembly (TOSA) 21 and a receiving Optical Sub-Assembly (ROSA) 22, a holder 51 and a substrate 13 (not illustrated in FIG. 1) are installed. The TOSA 21 and the ROSA 22 provides sleeve covers 31 in the tips thereof. The holder 51 sandwiches and secures the TOSA 21 and the ROSA 22 against the frame 11. The substrate 13 mounts electronic circuits thereon coupled with the TOSA 21 and the ROSA 22. The electronic circuit drives a semiconductor optical device such as laser diode for the TOSA 21. On the other hand, the electronic circuit amplifies and processes an electronic signal converted by the photodiode installed within the ROSA 22.

The frame 11 and the upper cover 12 also forms two optical receptacle 11c in a first region 11a provided in the front side of the optical transceiver 1. The optical receptacle 11c receives an optical connector attached in a tip of an optical fiber, which has the optical fiber to couple in optical with optical devices installed within the TOSA 21 and the ROSA 22. On the other hand, the second region 11b provided in the rear side of the transceiver mounts the substrate 13, as illustrated in drawing from FIGS. 9A and 9B. The end of the substrate 13 provides an electrical connector 13c that mates with another electrical connector mounted on the motherboard onto which this optical transceiver is to be also installed. Depending on the specification of the electronic connector 13c, a pluggable transceiver may be realized. That is, without shutting off the power supply of the motherboard, this optical transceiver 1 can be mounted on the motherboard. The frame 11 is made of metal or made of resin coated with metal. Thus, a space formed by the frame 11 and the upper cover 12, into which the substrate 13 and the electronic circuit on the substrate 13 are mounted, is electrically isolated from the outside of the transceiver 1 except for the optical connector 13c and the optical receptacle 11c.

The frame 11 provides, in the side thereof, a latching mechanism, 11d and 11e, to make the transceiver 1 latch with and fixed to the cage, which is not illustrate in FIG. 1, provided on the motherboard. The latching mechanism comprises an arm 11d extending from the side of the frame 11 and a hook 11e provided on the tip of the arm 11d, both of which are made of resin constituting the frame 11. Inserting the optical transceiver 1 into the cage and latching the hook 11e with the hole provided within cage, the optical transceiver 1 can be secured in the cage. When releasing from the cage, the hooking between the hook 11e and the cage may be released by pulling the arm 11d into the transceiver 1.

Next, the TOSA 21 and the holder 51 according to the present invention will be described in detail. The description below is primarily for the TOSA 21, however, the same description may be applicable to the ROSA 22.

Figure 2A:
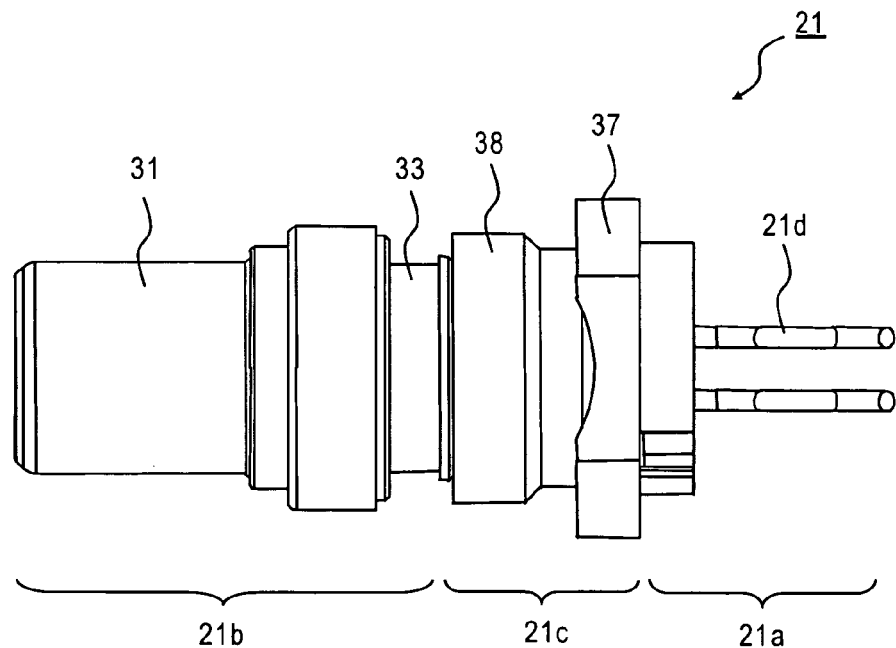
FIG. 2A is a side view of the optical subassembly of the invention.
Figure 2B:
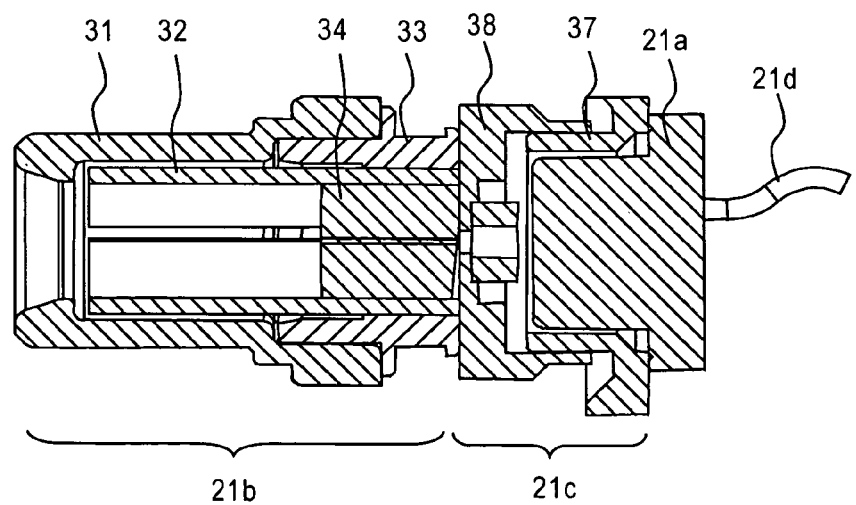
FIG. 2B is a side section of the optical subassembly.

FIG. 2A is a side view of the TOSA 21, while FIG. 2B is a side section thereof. The TOSA 21 includes a package 21a, a sleeve assembly 21b, and an alignment member 21c.

The package 21a is made of metal such as iron (Fe) coated with nickel (Ni) or Kovar™, and has a shape of, what is called, a co-axial type. Within the package 21a, a semiconductor laser diode for the TOSA 21, while a photodiode for the ROSA 22, are installed. FIG. 2B omits the detail of such semiconductor devices. From the end of the package 21a is extruded with a plurality of lead pins to connect the TOSA 21 to the electronic circuits mounted on the substrate 13. Although not illustrated in FIG. 2A and FIG. 2B, the package 21a may provide a lens on the top thereof, namely, on the side to the sleeve assembly 21b, to focus the light emitted from the semiconductor laser diode onto the edge of the optical fiber, or to concentrate the light emitted from the optical fiber onto the light sensitive surface of the photodiode.

Figure 3:
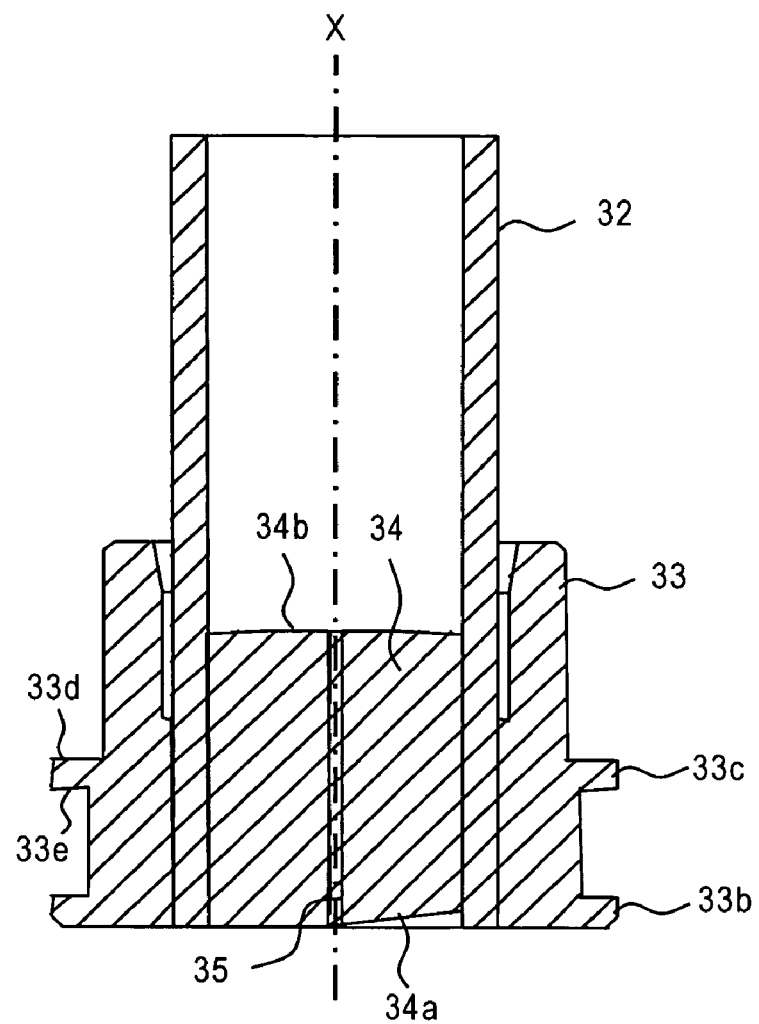
FIG. 3 is a section of the sleeve assembly of the present invention.

The sleeve assembly 21b is mounted on the top of the package 21a through the alignment member 21c. The sleeve assembly 21b includes, from the side of the alignment member 21c, a bush 33, a stub 34, a sleeve 32 and a sleeve cover 31. While, the alignment member 21c includes a first member 37 and a second member 38. FIG. 3 illustrates the side section of the sleeve assembly 21b. FIG. 3 omits the sleeve cover 31.

The stub 34 is secured in a root portion, i.e. the side to the alignment member 21c, of the sleeve 32. The stub 34 is made of ceramic, glass, or metal and has a cylindrical shape. Zirconia ceramic is a typical material for the stub 34. A coupling fiber, which optically couples with an extrinsic fiber provided within an optical connector mated with the transceiver 1, pierces the center of the stub 34. The one end surface 34a of the stub 34, i.e., the surface optically couples with the alignment member 21a is processed to incline by 5 to 7 degrees to a plane perpendicular to an optical axis X of the sleeve assembly 21b. This arrangement suppresses light emitted from the laser diode in the package 21a from being reflected by this end surface 34a to the direction parallel to the optical axis X. Accordingly, the reflected light is prohibited from entering the laser diode and causing the optical noise source.

The other end surface 34b of the stub 34 is processed, with the tip of the coupling fiber 35, to be convex surface. When inserting the optical connector into this sleeve assembly 21b, the extrinsic fiber secured in the center of the ferrule may come in contact in physical with the tip of the coupling fiber 35. Thus, two fibers enable the optical coupling therebetween as suppressing the Fresnel reflection at the contact point. The tip of the ferrule is processed to be convex with the tip of the extrinsic fiber. Accordingly, the light reflected by the contact point may be reduced, and the optical noise source for the laser diode may be decreased.

The bush 33 fills a gap between the sleeve 32 and the sleeve cover 31 in the side to the alignment member 21c. The sleeve 32 may be a split sleeve that provides a slit along the axial direction. The split sleeve is generally made of ceramic such as zirconia ceramic. The explanation below is primarily for the split sleeve, however, the sleeve assembly 21b according to the present invention may apply for the rigid sleeve without any slits.

The end of the sleeve 32, the side to the alignment member 21c evens out the end of the bush 33. When optical aligning the sleeve assembly 21b with the package 21a within a plane perpendicular to the optical axis X, the bush 33 can be slid with the sleeve 32 on the plane surface 38f of the second alignment member 38. The bush 33 covers the side to the alignment member 21c of the sleeve 32, while the sleeve cover 31 conceals the top side of the sleeve 32, accordingly, the sleeve 32 is not exposed into the transceiver 1.

The bush 33, made of metal such as stainless steel, covers the side of the sleeve 32. As illustrated in FIG. 2B, the bush 33 binds the sleeve 32 with the stub 34 at the side to the alignment member 21c. Thus, the sleeve 32 and stub 34 are rigidly secured with each other at the side to the alignment member 21c, the wiggle characteristic can be enhanced for the ferrule inserted into the sleeve 32. The wiggle characteristic is that the optical coupling loss between the optical fiber and the coupling fiber within the sleeve assembly 21b changes when the optical fiber, which is optionally suspended outside the transceiver, is shook.

The bush 33 provides a flange 33b in the end thereof. After optical aligning the sleeve assembly 21b within the plane perpendicular to the optical axis X by sliding thereof on the alignment member 21c, the YAG laser welding is carried out for the flange 33b to fix the sleeve assembly to the alignment member 21c. The bush 33 provides another flange 33c on the outer surface thereof. By coming the end of the sleeve cover 31 in contact to this flange 33c, which operates as a stopper for the sleeve cover 31, the position along the axis X of the sleeve cover 32 is automatically defined. Moreover, cooperating with the holder 51, the positions of the TOSA 21 and the ROSA 22 are automatically decided within in the transceiver 1.

Figure 4A:
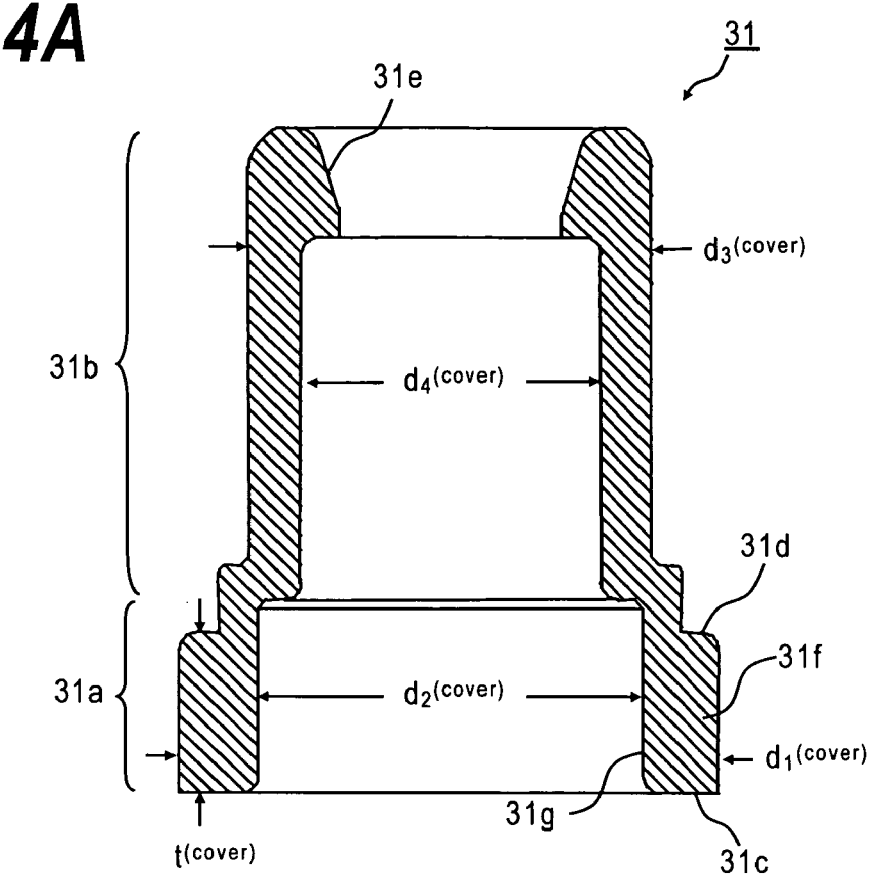
FIG. 4A is a section of the sleeve cover.
Figure 4B:
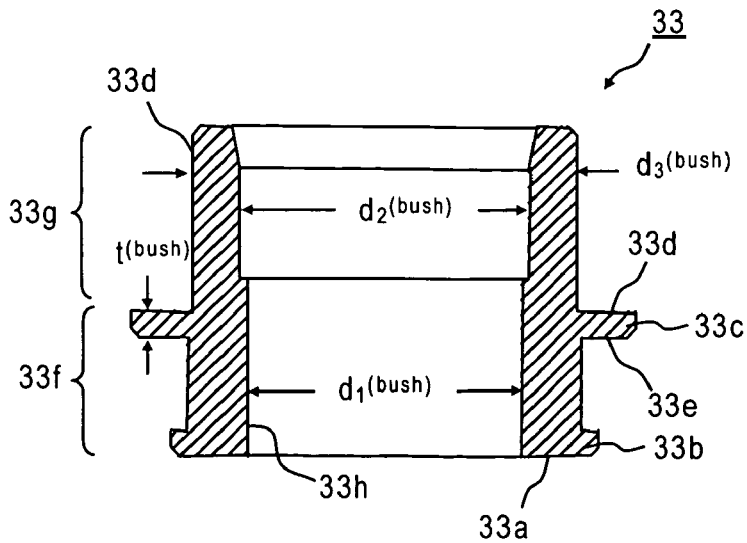
FIG. 4B is a side section of the bush.

FIG. 4A illustrates a side section of the sleeve cover 31. The sleeve cover 31 is made of resin and has a cylindrical shape, which not only covers the sleeve 32 and the bush 33 but electrically isolate those members from outside. The sleeve cover 31 includes a first portion 31a and a second portion 31b, both having a bore. The outer diameter $d_1^{(cover)}$ and the diameter $d_2^{(cover)}$ of the bore 31g of the first portion 31a are larger than the outer diameter $d_3^{(cover)}$ and the inner diameter $d_4^{(cover)}$ of the second portion, respectively. Moreover, as shown in FIG. 4B, the outer diameter $d_3^{(bush)}$ of the bush 33 is substantially equal to the inner diameter $d_2^{(cover)}$ of the first portion, and the inner diameter $d_4^{(cover)}$ of the second portion is set to be slightly greater than the outer diameter of the sleeve 32. The outer diameter $d_3^{(cover)}$ of the second portion may be defined in accordance with the standard of the optical connector to be inserted into the sleeve 32.

The first portion 31a forms a flange 31f with an outer diameter of $d_1^{(cover)}$ and a thickness of $t^{(cover)}$. From one side surface 31c of the flange 31f, which corresponds to the bottom surface of the sleeve cover 31, to the other side surface 31d corresponds to the thickness $t^{(cover)}$. The edge portion 31e of the bore of the second portion 31b is chamfered, which facilitates the insertion/extraction of the ferrule into/from the sleeve 32.

FIG. 4B illustrates a side section of the bush 33. The bush 33 also includes a first portion 33f and a second portion 33g. The diameter $d_1^{(bush)}$ of the bore 33h of the first portion 33f is substantially equal to or slightly smaller than the outer diameter of the sleeve 32, while the inner diameter $d_2^{(bush)}$ of the second portion 33g is set to be greater than the outer diameter of the sleeve 32. Thus, the inner surface of the second portion 33g detaches from the sleeve 32. Only the first portion 33f of the bush secures the sleeve 32 therein. The diameter $d_3^{(bush)}$ of the outer surface 33i of the second portion 33g is substantially equal to or slightly greater than the inner diameter $d_2^{(cover)}$ of the first portion 31a of the sleeve cover 31. Accordingly, the bush 33 and the sleeve cover 31 may be assembled by press-fitting the second portion 33g of the bush 33 into the bore 31g of the first portion of the sleeve cover 31. At the press-fitting, it is unnecessary to apply an adhesive on the outer surface 33d of the bush and the bore surface 31g of the sleeve cover 31. Since the sleeve cover 31 is made of resin while the bush is made of metal, the press-fitting may be carried out with ease.

Figure 6A:
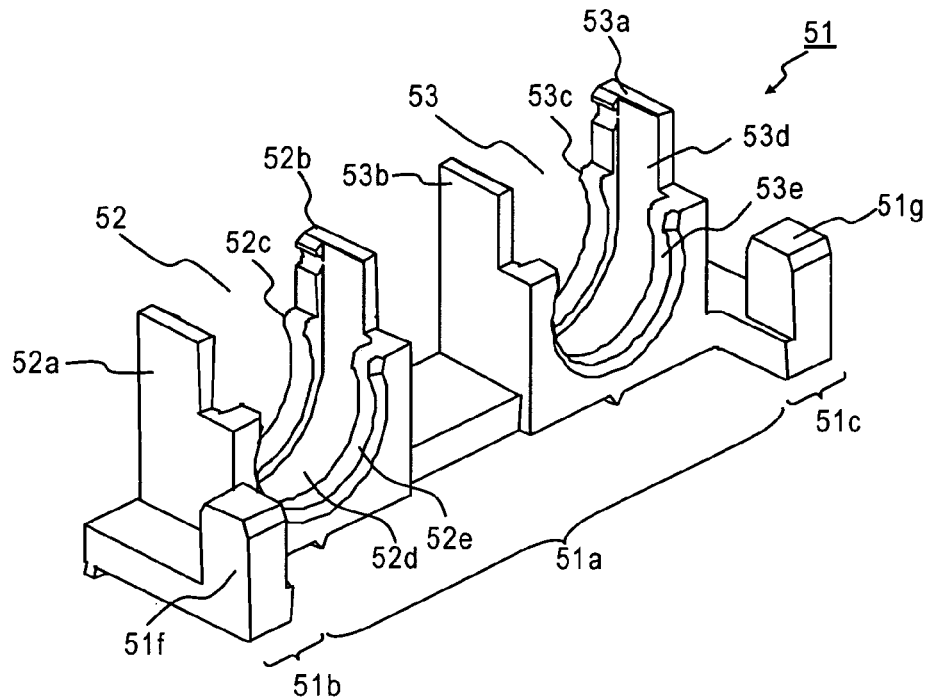
FIG. 6A illustrates the holder viewed from one direction, and FIG. 6B also illustrates the holder view from a different direction to that of FIG. 6A.
Figure 6B:
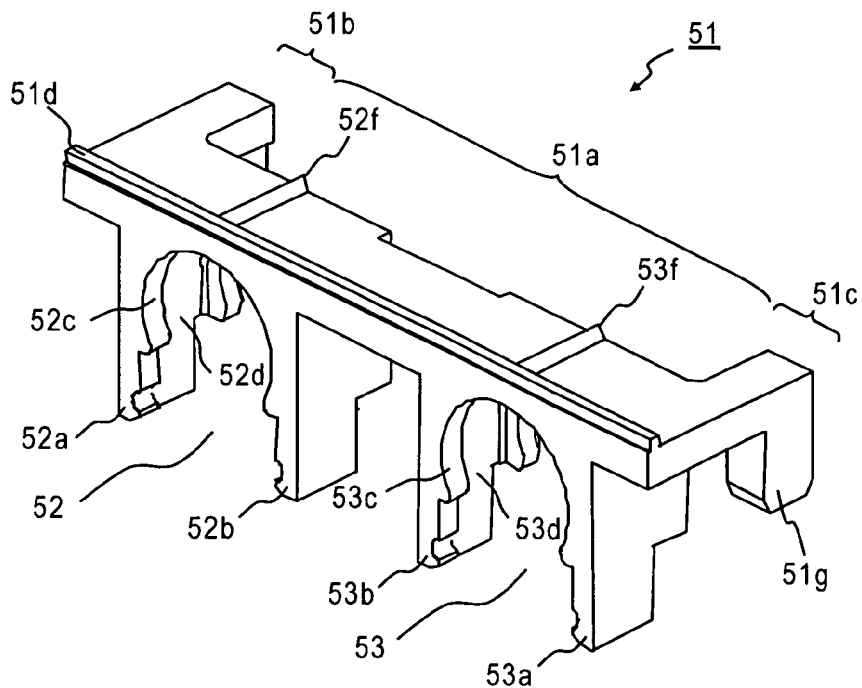

The bush 33 provides the flange 33c with a thickness $t^{(bush)}$ in the outer surface of the first portion 33f close to the boundary to the second portion 33g. The flange 33c has two side surfaces 33d and 33e. The surface 33d operates as the stopper surface when the bush 33 is press-fitted into the sleeve cover 31, while the other surface 33e abuts, when the sleeve assembly 21b is secured to the holder 51, on the rib formed therein, as illustrated in FIG. 6A and FIG. 6B. That is, when the bush 33 is press-fitted into the sleeve cover 31, the fitting may be stopped by the surface 33d of the flange 33c coming in contact to the bottom surface 31c of the sleeve cover 31. Then, the flange 33c of the bush 33 integrates another flange 31f of the sleeve cover 31, and forms an united flange with a thickness of $t^{(cover)} + t^{(bush)}$ determined by two surfaces, 31d and 33e. As explained later, the grooves, 53e and 53d, formed within respective openings, 52 and 53, of the holder 51 receive this united flange, thereby positioning the TOSA 21 and the ROSA 22 against the holder 51.

Figure 5:
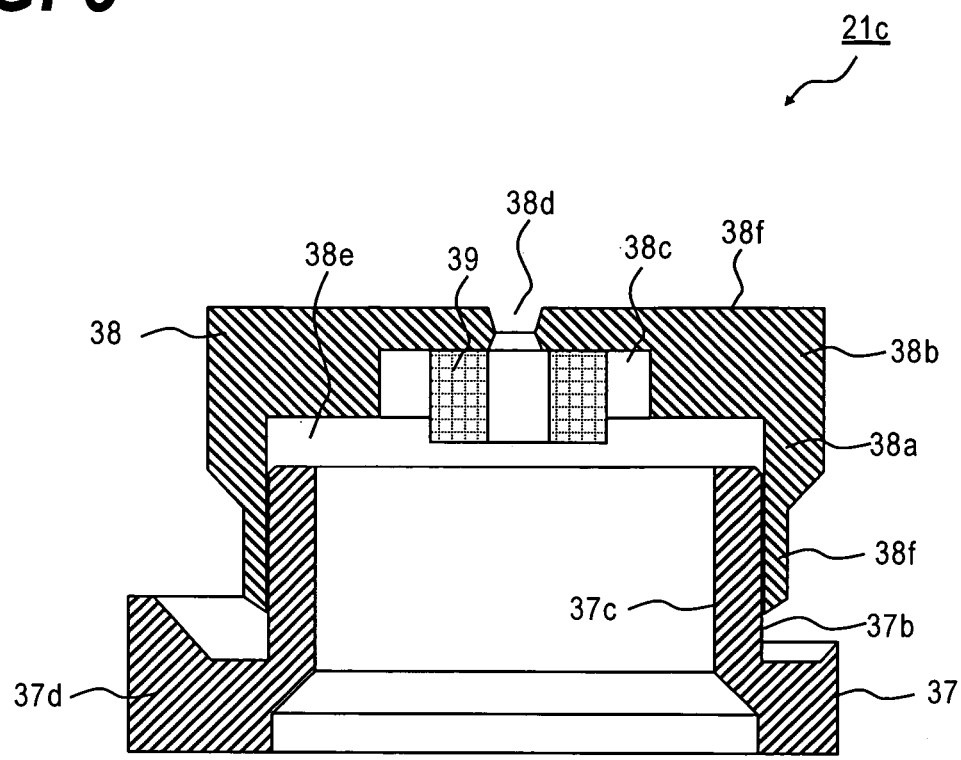
FIG. 5 is a side section of the alignment member of the present invention that comprised of the first and second members.

FIG. 5 is a side section of the alignment member 21c. The alignment member 21c comprises the first member 37 and the second member 38. Both members, 37 and 38, are made of metal, such as Kovar™, iron (Fe) coated with nickel (Ni) or stainless steel, those metals show rather low thermal conductivity. The first member 37 holds the package 21a within the bore 37c thereof, and fixed in the bottom 37a to the stem of the package 21a by the resistance welding, which is called as the projection molding. The outer surface 37b of the first member 37 comes in contact with the inner surface of the second member 38, which will be explained next, and both members, 37 and 38, are welded at this contact point by the YAG laser. In detail, the second member 38 has a thin wall 38f in the side 38a thereof, and the side 38a of the second portion 38 can be fixed to the outer side 37b of the first member by irradiating the YAG laser onto this thinned wall portion 38f.

The YAG laser welding can be applicable directly to the package 21a without inserting the first member 37 between the package 21a and the thinned wall portion 38f of the second member, because the package 21a is made of metal. However, the wall thickness of the package 21a, especially the side wall thereof, is generally so thin to cause the pore when irradiated by the YAG laser, which results in the leaking of the package 21a. From the viewpoint of the long-term reliability of the semiconductor device installed within the package 21a, it must be hermetically sealed from the ambient. Therefore, the first member 37 is inevitable for the package with the thinned wall to avoid the leaking due to the pore by the YAG laser welding. When the package 21a provides a thick enough wall, the first member 37 may be removed.

On the other hand, to widen the bottom portion 37d of the first member 37 is effective to enhance the heat dissipation. The laser diode for the TOSA 21 and the amplifier for the ROSA are installed within the package 21a. Both devices are heat-generating devices. Moreover, the laser diode shows strong temperature dependence in its performance, accordingly, to provide the heat dissipation member such as the first member 37 in the package, 21a shows an advantage to maintain the performance of the laser diode.

The second member 38 includes a side portion 38a and a ceiling portion 38b, which forms a space 38e where the package 21a and the first member 37 are received in. The inner diameter of the space 38e is slightly greater than the outer diameter of the first member 37. The sleeve assembly 21b, illustrated in FIG. 2A, is installed onto this ceiling portion 38b of the second member 38. By sliding the second member 38 on the outer surface 37b of the first member 37, the optical alignment along the optical axis can be carried out between the sleeve assembly 21b, in particular, the end surface 34a of the stub 34, i.e. the end of the coupling fiber 35, and the optical device installed in the package 21a. As explained before, the YAG laser welding fixes the thinned wall portion 38f of the second member 38 to the first member 37.

In a center of the ceiling portion 38b, an area where the optical axis connecting the sleeve assembly 21b and the optical device passes therethrough, is formed with a hollow 38c in the inner side. The hollow 38c mounts an optical isolator 39. The optical isolator 39 prevents the light emitted from the laser diode in the package 21a from returning the laser diode after reflected by the end of the coupling fiber 35, which reduces the optical noise for the laser diode. Since the hollow 38c mounts the isolator 39 therein, the length of the TOSA 21 along the optical axis may be shortened.

The outer surface 38f of the ceiling portion 38b of the second member 38 is processed in flat, and the center thereof provides an aperture 38d through which the optical axis passes. The sleeve assembly 21b, in particular, the end surface of the stub 34, that of the sleeve 32, and that of the bush 33 may slide on this flat outer surface 38f of the ceiling portion 38b, which enables the optical alignment in the plane perpendicular to the optical axis. After the alignment, the flange 33b provided in the end of the bush 33 is welded to this flat surface 38f by the YAG laser, thus fixing the sleeve assembly 21b to the alignment member 21c.

Next, the configuration of the holder 51 to install these TOSA 21 and the ROSA 22 into the transceiver 1 will be described in detail.

Figure 7A:
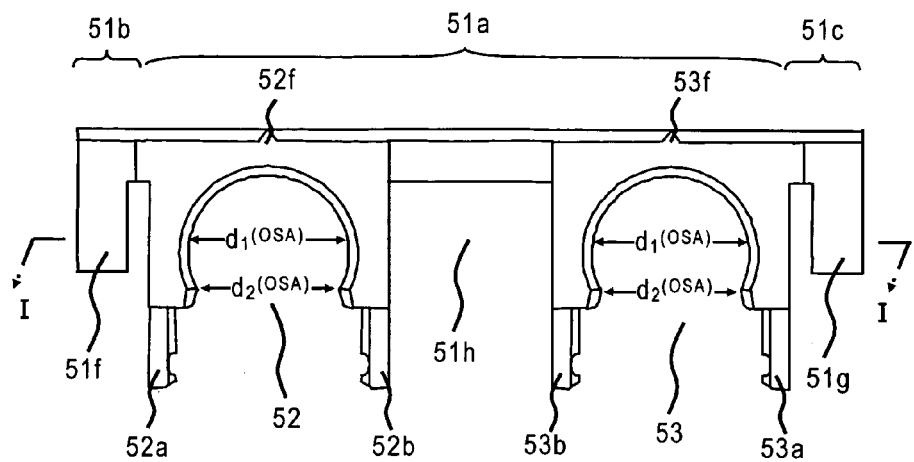
FIG. 7A is a front view of the holder.
Figure 7B:
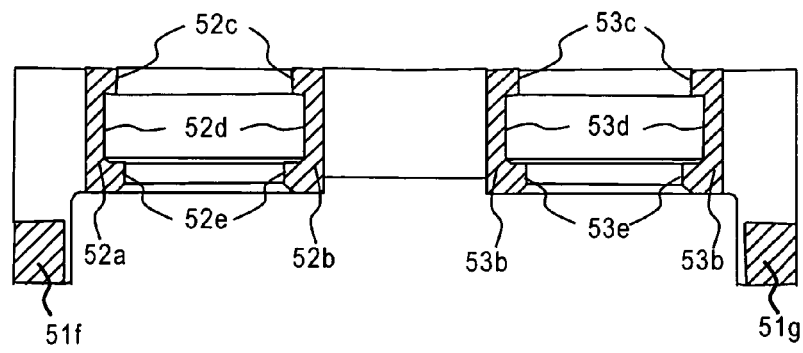
FIG. 7B is a section taken along the line I-I illustrated in FIG. 7A.

FIG. 6A is a perspective illustration of the holder 51 viewed from one direction, while FIG. 6B is another perspective illustration viewed from the different direction to that of FIG. 6A. FIG. 7A is a front view and FIG. 7B is a section taken along the line I-I shown in FIG. 7A.

The holder 51 may be made of resin coated with metal. The holder 51 includes a center portion 51a that provides a pair of openings, 52 and 53, each for receiving the sleeve assemblies, 21b and 22b, and a pair of side portions, 51b and 51c, each forming posts, 51f and 51g, for positioning this holder 1 against the frame 11 of the transceiver 1. The opening 53 has a shape of a horseshoe surrounded by a pair of posts, 53a and 53b. A pair of ribs, 53c and 53e, and a groove formed by these ribs, 53c and 53e, are formed along the inside surface of the opening 53. The groove 53d receive two flanges, 31f and 33c, of the sleeve cover 31 and that of the bush 33, respectively, as an united flange, and the side surfaces, 31d and 33e, of this united flange come in contact with the side surfaces of the ribs, 53c and 53e, respectively. Thus, the holder 51 fixes the TOSA 21, at the same time, the position of the TOSA 21 along the optical axis is automatically defined. This means that the length of the sleeve cover 31 extending into the optical receptacle 11c is defined.

As illustrated in FIG. 7A, the opening 53 has a section with a horseshoe shape. That is, the opening width $d_2^{(OSA)}$ is smaller than the widest width $d_1^{(OSA)}$ at the middle of the opening. Accordingly, the TOSA 21 once set within the opening 53 is hard to be off from the opening 53. The TOSA 21 may be set into the opening 53 as the posts, 53a and 53b, are widened in their gap $d_2^{(OSA)}$ because the resin made holder 51 intrinsically has a resilient characteristic. The description above is for the combination of the TOSA 21 and the holder 51, the same explanation may be applied to the ROSA 22 case by replacing the opening 53, the posts 53a and 53b, the ribs 53c and 53e, and groove 53d to the equivalent structures for the ROSA 22.

Figure 8A:
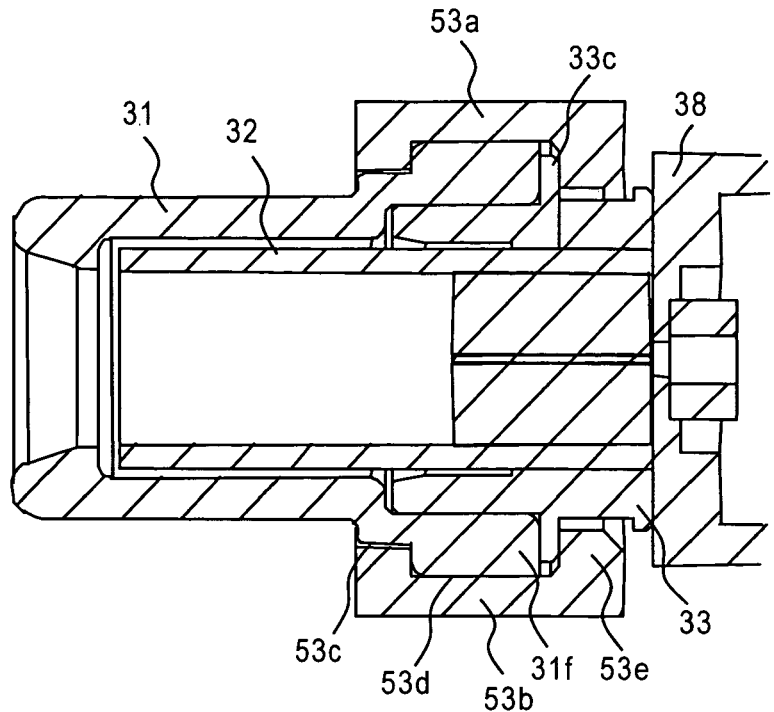
FIG. 8A is an expanded section showing the mating structure between the holder and the optical subassembly.

FIG. 8A is a view showing the TOSA 21 (or the ROSA 22) is assembled in the holder 51, in particular, the figure magnifies the portion of the groove 53d of the holder 51 and the united flange of the TOSA 21 set in the groove 53d. The TOSA 21 has the united flange formed by the flange 31d of the sleeve cover 31 and that of the bush 33. This united flange is set within the groove 53d between the ribs, 53c and 53e, formed in the posts, 53a and 53b. The side of the united flange in the front side, which corresponds to the side surface 31d of the flange 31, abuts against the front rib 53c, while the side of the united flange in the rear side, which corresponds to the side 33e of the flange 33c, abuts against the rear rib 53e.

Figure 8B:
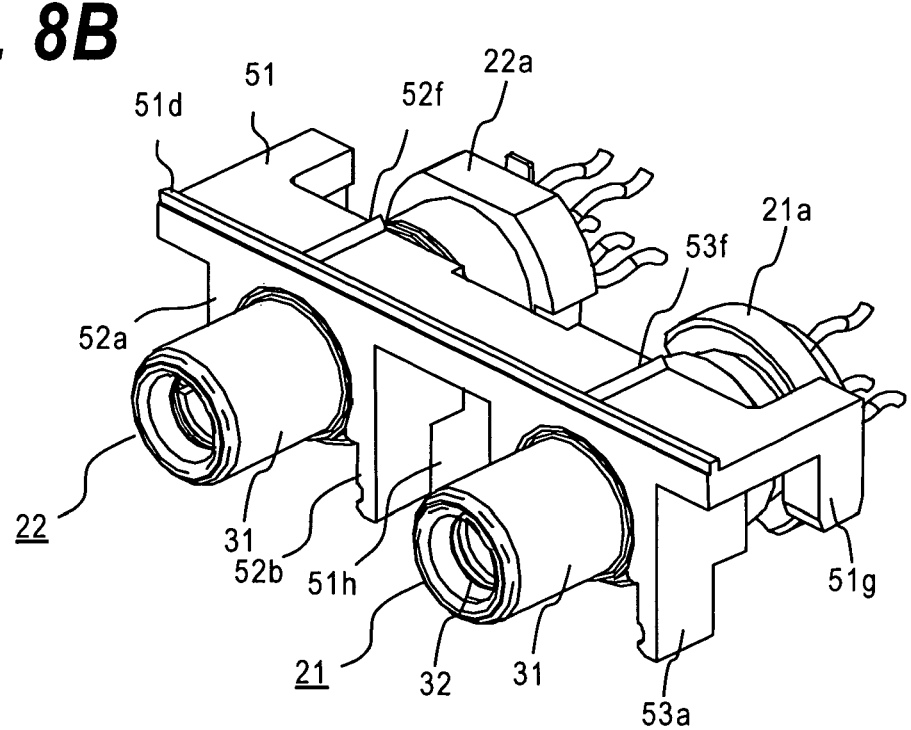
FIG. 8B is a perspective view illustrating the holder with the TOSA and the ROSA being assembled therewith.

FIG. 8B shows an appearance when the TOSA 21 and the ROSA 22 are assembled with the holder 51. On the upper surface of the holder 51, two ribs, 52f and 53f, with a triangular section are formed each corresponding to the TOSA 21 and the ROSA 22 and extending parallel to respective optical axes. The front tips of these ribs, 52f and 53f, are connected to another rib 51d with a rectangular section and extending along a direction intersecting the optical axis. As shown later in FIG. 12, the upper cover 12 to which the holder 51 is attached provides a groove 12c mating with this rib 51d in the inner side thereof. By putting this rib 51d into the groove 12c on the upper cover 12, the positional relation of the holder 51 to the upper cover 12 is automatically defined.

Figure 9A:
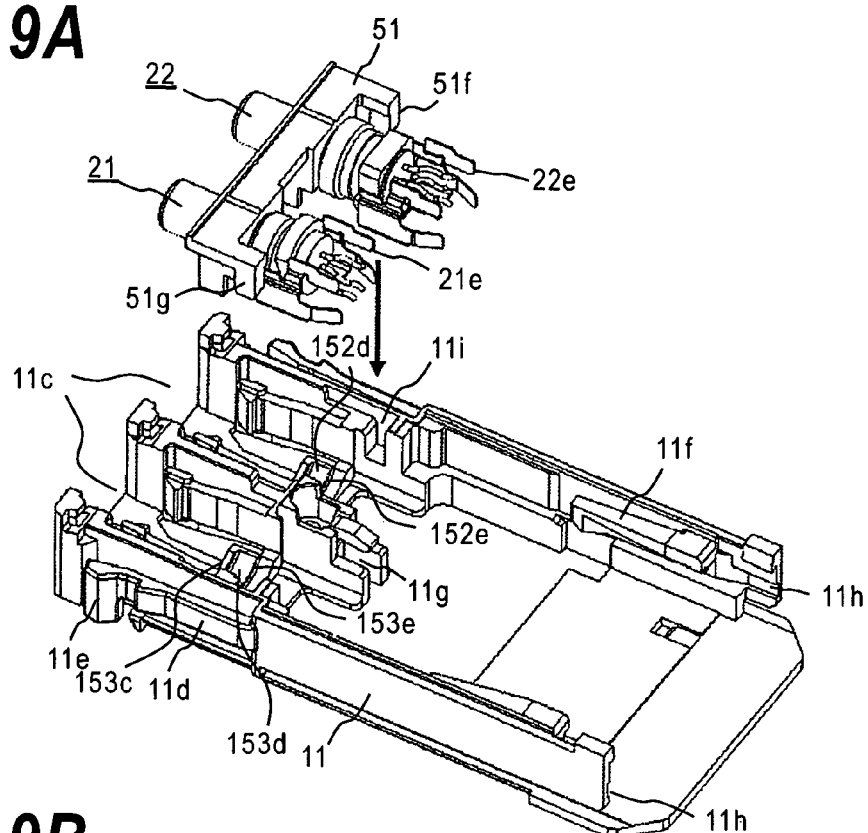
FIG. 9A illustrates the step for assembling the holder with the optical subassembly into the frame.
Figure 9B:
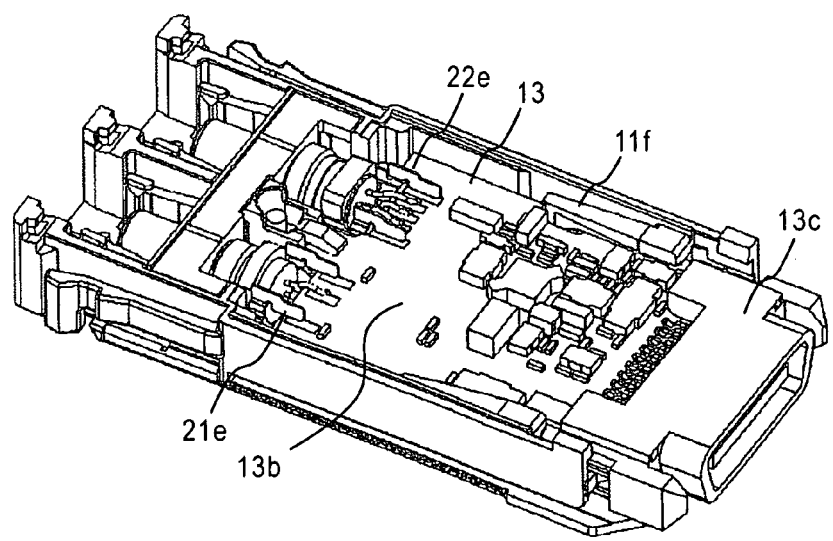
FIG. 9B illustrates the step for installing the substrate in to the frame.

The both sides, 51b and 15c, of the holder 51 form posts, 51f and 51g, and a center of the center portion 51a, i.e. between the posts 52b and 53b, are off to form an opening 51h. As illustrated in FIG. 9A, the posts, 51f and 51g, are stuck into the groove 11i formed in the side wall of the frame 11. For the opening 51h, the holder 51 with the TOSA 21 and the ROSA 22 are set into the frame 11 such that the opening 51h receives the center wall partitioning respective receptacles for the TOSA 21 and the ROSA 22. Thus, the holder 51 is positioned against the frame 11.

Next, the process for assembling the optical transceiver installing thus described optical subassemblies will be described. From FIG. 9A to FIG. 12 illustrate in series the manufacturing step of the optical transceiver 1 with the TOSA 21 and the ROSA 22. This optical transceiver 1 has an appearance in accordance with, what is called, the GBIC™ (Giga-Bit Interface Converter) standard. The SC-type optical connector mates with the optical receptacle 11c.

First, the holder 51 assembled with the TOSA 21 and the ROSA 22 is secured with the frame 11. As described, the posts, 51f and 51g, formed in the both sides, 51b and 51c, of the holder 51 are stuck into the groove 11i provided in the side wall of the frame 11. In the same time, the opening 51h between the posts, 52b and 53b, of the holder 51 receives the center partition of the frame. The bottom of the frame 11 forms a saddle to cover the lacked portion of the openings 52 of the holder 51. On the surface of the saddle are provided with a pair of ribs, 152c and 152e, and a groove 152d between these ribs. A similar saddle with a pair of ribs, 153c and 153e, and a groove 153d, is provided in the side of the TOSA 21. Accordingly, setting the holder 51 to the frame 11, the united flange is received in the whole periphery thereof by these grooves, 53d and 153d, for the TOSA 21, while grooves 52d and 152d for the ROSA 22.

Before assembling the TOSA 21 and the ROSA 22 with the holder 51, it is preferable to attach metal bracket, 21e and 22e, to respective packages, 21a and 22a, to surround lead pins, 21d and 22d.

Next, the frame 11 receives the substrate 13 in the second portion 11b thereof such that the substrate 13 slides from the rear side of the transceiver 1. The substrate 13 may be made of conventional glass epoxy substrate or ceramic substrate. The frame 11 has a pair of latch bars 11f in both side walls and a groove 11g in the partition wall of the front side to secure the substrate 13. Inserting the substrate 13 from the rear by spreading out the latch bars and inserting the front edge thereof into the groove 11g, the substrate 13 may be fixed to the frame 11 to mate the latch bar 11f with the cut provided in the both sides of the substrate 13, which prevents the substrate 13 from releasing from the frame 11. The substrate 13 has the connector 13c in the rear and an electronic circuit with a plurality of passive and active parts thereon.

After setting the substrate 13 in the frame 11, lead pins, 21d and 22d from the TOSA 21 and the ROSA 22 are soldered to corresponding interconnections on the substrate 13. At that time, brackets, 21e and 22e, extending from respective packages, 21a and 22a, are also soldered to patterns provided to surround the above interconnections. Thus, the brackets, 21e and 22e, ground the metal parts in the TOSA 21 and the ROSA 22, such as package 21a, alignment member 21c, and bush 33 in the sleeve assembly 21b, provided on the substrate 13 to reinforce the ground potential of the TOSA 21 and the ROSA 22. Moreover, the brackets, 21e and 22e, are directly in contact to the packages, 21a and 22a, which enhances the heat dissipating efficiency from the packages, 21a and 22a.

Figure 10A:
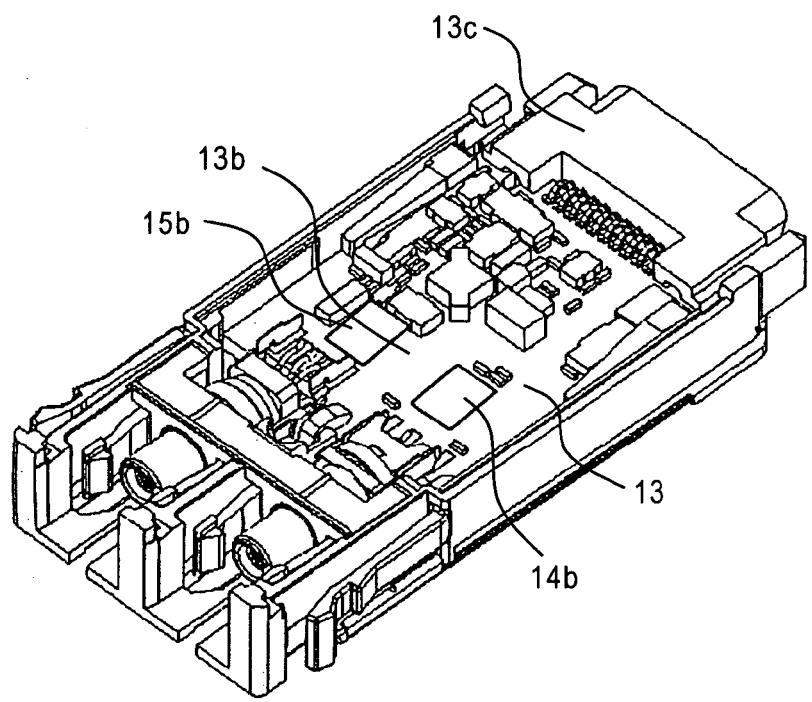
FIG. 10A illustrates the manufacturing step of the heat spreader being attached onto the substrate.
Figure 10B:
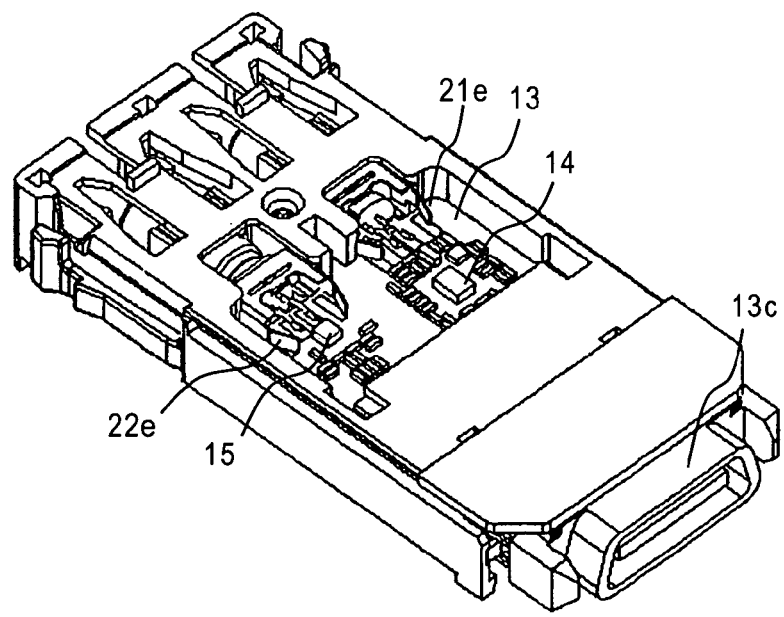
FIG. 10B is a perspective view of the optical transceiver from the bottom thereof.

The substrate 13 mounts the driver IC 14 for driving the laser diode installed in the TOSA 21 and the amplifier IC for amplifying the signal sent from the ROSA 22. These driver IC 14 and amplifier IC 15 are installed on the back surface, the surface not appeared in FIG. 9B, of the substrate 13. The front surface 13b corresponding to the installed region in the back is widely opened. To install heat sinks, 14b and 15b, on this opened area 13b on the front surface and to conduct the heat generated by these ICs, 14 and 15, to the upper cover 13 by inserting thermal sheets with high thermal conductivity between the upper cover 13 and the heat sinks, 14b and 15b, can enhance the heat dissipation from the ICs, 14 and 15. When the substrate 13 is made of glass epoxy or ceramic, as those of the conventional substrate, the heat dissipation from these ICs may be ineffective due to their small thermal conductivity. Therefore, in order to enhance the thermal conductivity between the front and rear surfaces of the substrate 13, via holes filled with metal and formed with high density may be effective for the heat dissipation from these ICs (FIG. 10A). FIG. 10B is a perspective illustration viewed from the back of the transceiver 1 with the substrate being set therein. To solder the lead pins, 21d and 22d, and the brackets, 21e and 22e, to the interconnections and the patterns, respectively, on the substrate 13, the frame widely opens its bottom. The ICs, 14 and 15, above described are thermally coupled to the bottom cover 16 through thermal sheets sandwiched between the ICs and the bottom cover 16.

The arrangement for the heat dissipation from the ICs, 14 and 15, mentioned above, has an advantage in particular when the ICs, 14 and 15, have a chip with the bared form encapsulated with a mold resin. In such encapsulation of the chip, it is quite difficult to provide a structure to dissipate the heat on the top of the encapsulation, accordingly, the heat dissipation through the substrate 13 is the only method left to such arrangement. In addition to the conventional arrangement, in which the conduction pattern is provided on the substrate 13 for the heat dissipation and this pattern is extended to touch the heat sink, which may be called as the two-dimensional heat dissipation, the present arrangement of the heat dissipation to the front surface through the substrate 13, which seems to be the three-dimensional heat dissipation, can show further performance of the heat dissipation.

Figure 11A:
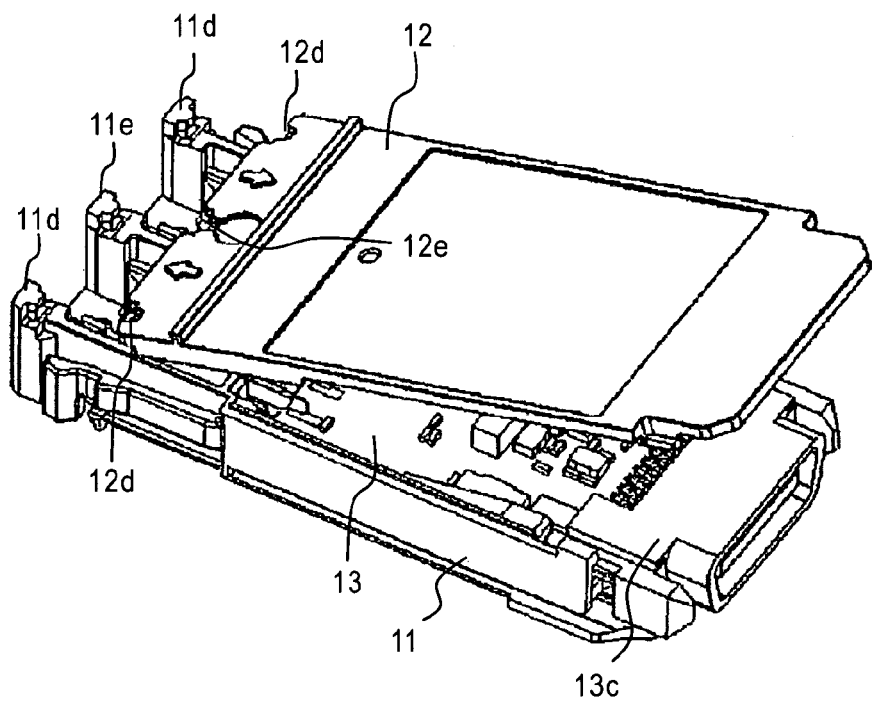
FIG. 11A illustrates the step of assembling the upper cover to the frame.

FIG. 11A illustrates when the transceiver 1 thus assembled equips the upper cover 12. The upper cover 12 may be made of metal such as copper (Cu) coated with nickel (Ni). As already described, the upper cover 12, because the heat generated in the ICs, 14 and 15, are conducted thereto, may be made of material with good thermal conductivity. The front side of the upper cover 12 forms a plurality of cuts, 12d and 12e, which mates with the grooves, 11d and 11e, formed in the both side walls and the center partition wall, respectively, each constituting the optical receptacle 11c. A screw inserted from the bottom of the frame 11 fixes the upper cover 12 to the frame 11.

Figure 11B:
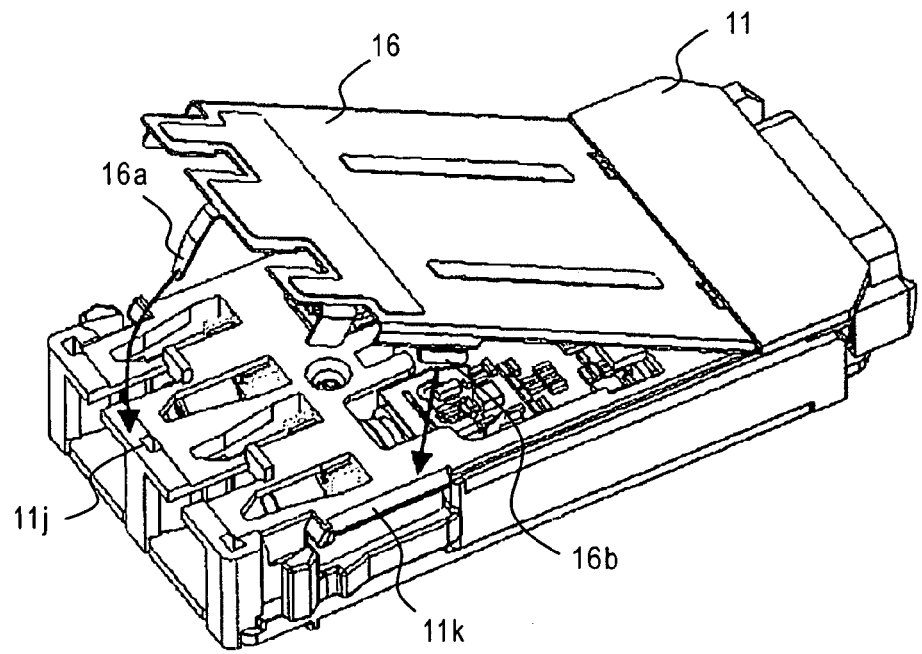
FIG. 11B illustrates the step of assembling the lower cover to the frame.

Finally, the lower cover 16 is put on the frame 11. The lower cover 16 has a finger 16a in the front and a pair of latches 16b in respective side walls. First, putting on the rear of the lower cover 16 in the gap formed in the rear of the frame 11, subsequently, plunging the finger 16a into the hole formed in the front wall and mating the latch 16b with the hook 11k of the frame 11, the lower cover 16 is assembled with the frame 11. Thus, the frame 11 secures the lower cover 16 without a screw, as shown in FIG. 11B.

Figure 12:
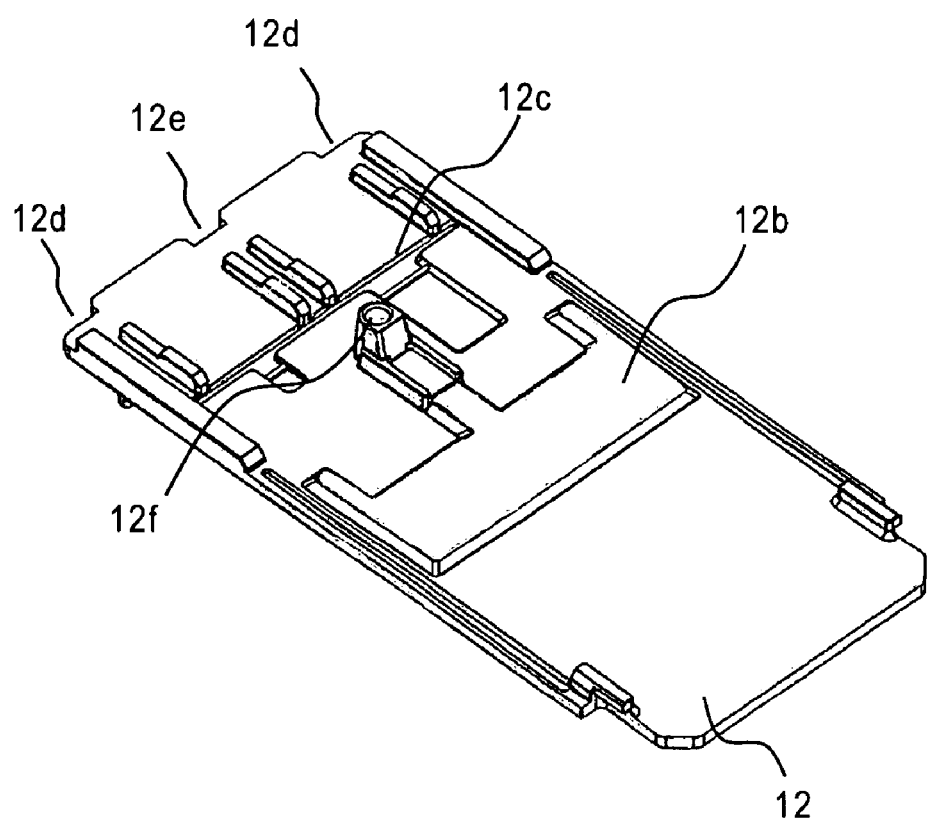
FIG. 12 illustrates the inner side of the upper cover.

FIG. 12 shows the inside of the upper cover 12. The upper cover 12 forms, in a portion corresponding to the inner wall of the optical receptacle 11c, a groove 12c mating with the rib 51d of the holder 51 to cross the upper cover 12. Moreover, the upper cover 12 has a thick portion corresponding to the opened area 13b of the substrate 13. Depending on the ICs, 14 and 15, installed in the transceiver 1, the position thereof on the substrate 13 is not always constant. For example, even various transceivers having the same appearance, not only the laser diode installed therein is different to each other but the driver IC 14 or the amplifier IC 15 show different heat consumption depending on the specification of the transceiver 1, in particular on the communication distance thereof. Therefore, in order to apply the upper cover with the single configuration to these various ICs, the upper cover 12 widely has this thick area. By forming the upper cover 12 in thick, the performance of the heat conduction may be further effective. Within the projection 12f is provided with the thread for the screw that fixes the upper cover 12 to the frame 11.

Figure 13:
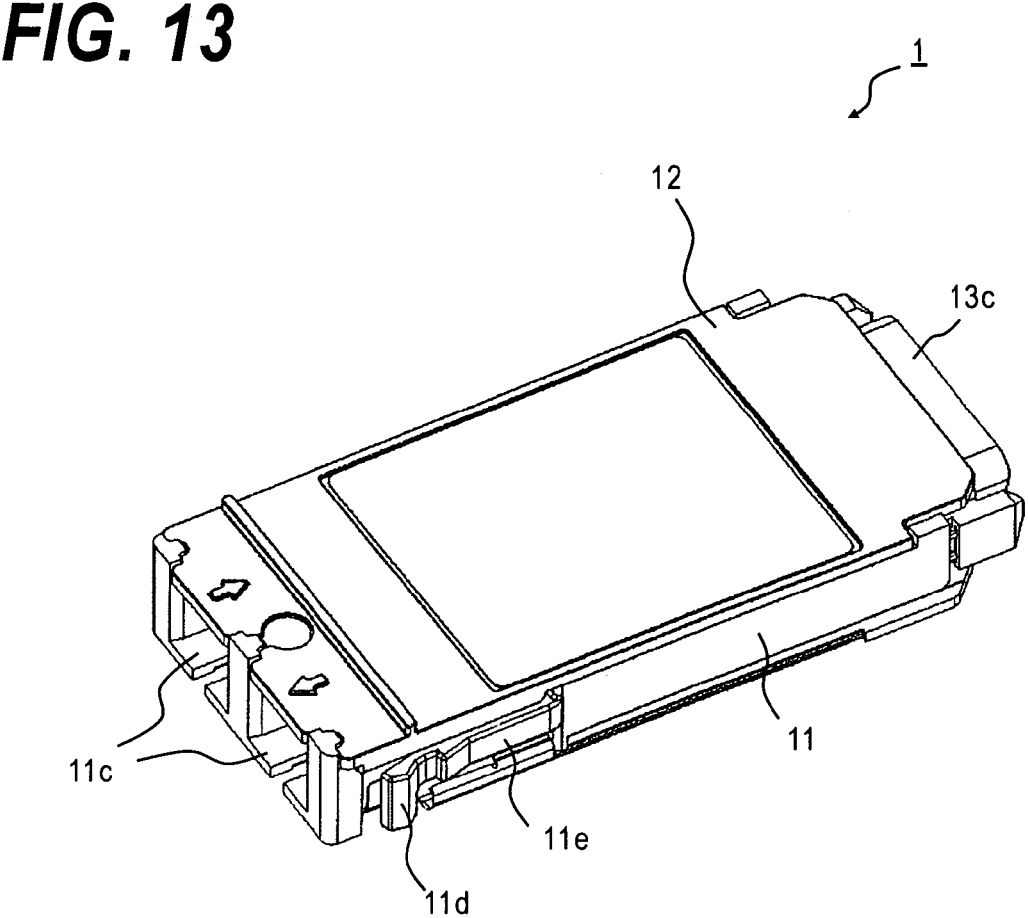
FIG. 13 illustrates the completion of the optical transceiver according to the present invention.

FIG. 13 illustrates a completion of thus assembled transceiver 1. The metal upper cover 12, the metal bottom cover, and the frame 11 shields the substrate 13 and the electronic circuit on the substrate 13 except the optical receptacle 11c and the connector 13c. Since the connector mates with the other connector on the mother board, the EMI (Electro-Magnetic Interference) noise does not leak through this connector 13c. On the other hand, the receptacle 11c exposes its opening from not only the transceiver 1 itself, but from the equipment where the transceiver 1 is installed to the outside of the equipment. Therefore, the EMI leaking from the optical receptacle 1 should be practically prevented. The sleeve assemblies, 21b and 22b, according to the present invention, provide, in the tip thereof, a resin made sleeve cover 31 and only this sleeve cover 31 exposes within the optical receptacle 11c. Accordingly, the EMI leaking through the sleeve cover can be effectively prevented.

Further, because the sleeve cover 31 is made of insulating material, even when the optical connector to be mated with the optical receptacle 11c is electrically charged, the insulating sleeve cover 31 can prevent the connector from discharging the static charge to the inside of the transceiver 1, thereby enhancing the tolerance of the optical components such as laser diode and photodiode to the electrostatic discharge. Moreover, these advantages can be obtained without any specific structures for the subassemblies, but can be realized merely the united flange comprised of the flange 31d in the sleeve cover 31 and the other flange 33c in the bush 33 is positioned in the groove provided in the holder 51. Without any additional structures and steps from the viewpoint of the manufacturing, the optical transceiver of the present invention may be obtained.

While the invention has been thus described in terms of preferred embodiments, those skilled in the art will recognize that the invention can be practiced with modification within the spirit and scope of the following claims.

What is claimed is:

1. An optical subassembly mating with an optical connector including an optical fiber and a ferrule attached to a tip of said optical fiber, said optical subassembly comprising:
a package having a cylindrical shape for installing a semiconductor optical device that optically couples with said optical fiber; and
a sleeve assembly attached to said package, said sleeve assembly receiving said ferrule, said sleeve assembly including a sleeve, a metal bush having a first flange, and a sleeve cover made of resin with a flange, said sleeve cover, said bush and said sleeve having a cylindrical shape and said sleeve cover covering said bush and said sleeve,
wherein said first flange of said bush and said flange of said sleeve cover constitute an united flange such that, when said bush is assembled with said sleeve cover, said flange of said sleeve cover abuts against said first flange of said bush.

2. The optical subassembly according to claim 1, wherein said bush includes a first portion with a first bore and a second portion with a second bore, and
wherein an outer diameter of said sleeve is smaller than an inner diameter of said second bore and is substantially equal to an inner diameter of said first bore by press-fitted therein.

3. The optical subassembly according to claim 2, wherein said sleeve cover includes a first portion with a first bore and a second portion with a second bore, said outer diameter of said second portion of said bush being substantially equal to an inner diameter of said first bore of said sleeve cover by press-fitted therein.

4. The optical subassembly according to claim 3, wherein said first flange of said bush is provided in said first portion of said bush close to a boundary between said first and second portions of said bush, and the flange on said sleeve cover is in an end portion of said first portion of said sleeve cover provided.

5. The optical subassembly according to claim 1, further comprises a metal alignment member provided between said package and said sleeve assembly, said alignment member optically aligning said semiconductor optical device with said optical fiber received by said sleeve of said sleeve assembly.

6. The optical subassembly according to claim 5, wherein said alignment member includes a first metal member and a second metal member each having a cylindrical shape so as to fit said package, said first metal member covering a side of said package and being attached thereto, said second metal member covering and being welded to said first metal member, and
wherein said sleeve assembly is attached to said second metal member.

7. The optical subassembly according to claim 1, wherein said sleeve is a split sleeve.

8. The optical subassembly according to claim 1, wherein said semiconductor optical device is a semiconductor laser diode.

9. An optical transceiver for mating with an optical connector that includes an optical fiber and a ferrule attached to a tip of said optical fiber, said optical transceiver comprising:
an optical subassembly according to claim 1;
a holder for holding said optical subassembly, said holder including a center portion and a pair of side portions, said center portion disposing a pair of posts for forming an opening to receive said optical subassembly;
an upper cover; and
a frame for securing said holder and for forming, cooperating with said upper cover, an optical receptacle configured to receive said optical connector;
wherein said opening formed in said posts provides a pair of ribs and a groove sandwiched by said ribs, said subassembly being secured to said holder by receiving said united flange in said groove.

10. The optical transceiver according to claim 9, wherein said frame further includes a saddle having a pair of ribs and a groove sandwiched by said ribs of said saddle, said subassembly being held on said saddle by receiving said untied flange in said groove formed in said saddle when said holder is secured to said frame.

11. The optical transceiver according to claim 9, wherein said side portions of said holder provide a post and said frame provides a groove in a side wall thereof configured to receive said post when said holder, is secured to said frame.

12. The optical transceiver according to claim 9, wherein said optical transceiver further includes another optical subassembly according to claim 1, said frame further includes a partition wall configured to divide said subassembly from said another subassembly, and said center portion of said holder further includes another pair of posts configured to hold said another subassembly and an opening between said posts and said another pair of posts, and wherein said opening between said posts and said another pair of posts mates with said center partition wall when said holder is fixed to said frame.

13. The optical transceiver according to claim 9, wherein said frame is made of resin coated with metal.

14. The optical transceiver according to claim 9, wherein said holder is made of resin coated with metal.

15. The optical transceiver according to claim 9, wherein said opening formed by said posts in said center portion of said holder has a horseshoe shape.

* * * * *